United States Patent Office 3,679,637
Patented July 25, 1972

3,679,637
CATIONIC PRECIPITATION POLYMERIZATION OF VINYL CARBAZOLE
Eugene V. Hort, Piscataway, N.J., assignor to GAF Corporation, New York, N.Y.
No Drawing. Filed Mar. 12, 1970, Ser. No. 19,092
Int. Cl. C08f 7/16
U.S. Cl. 260—88.3
10 Claims

ABSTRACT OF THE DISCLOSURE

A process is provided for obtaining particulate low molecular weight poly(vinyl carbazole) comprising charging (1) monomeric vinyl carbazole, (2) an inert, organic solvent for said vinyl carbazole, said solvent being a nonsolvent for the resulting polymer and (3) a catalytically effective amount of a cationic polymerization catalyst to a polymerization zone; maintaining the resulting mixture in said zone at a temperature ranging from about −50° C. to about +100° C. for a period of time sufficient to cause polymerization of said monomer and substantially simultaneous precipitation of discrete particles of poly(vinyl carbazole) forming a polymer slurry, and thereafter recovering said polymer from said slurry.

---

This invention relates to the polymerization of vinyl carbazole. More particularly, this invention relates to the cationic polymerization of vinyl carbazole wherein the resulting polymer is obtained in particulate form and can be easily recovered.

Poly(vinyl carbazole) exhibits many unique and desirable properties which render the polymer useful in many fields, especially in electrical applications. The polymer provides abnormally high heat resistance for a vinyl type thermoplastic polymer, exhibiting a softening temperature above 200° C. It has a very low power factor, a high dielectric strength and high volume and surface resistivities. Because of the relative immobility of the bulky carbazole side groups, the dielectric losses are quite low.

Although the mechanical properties of poly(vinyl carbazole) are relatively poor, the polymer has found great utility in the field of electronics where exacting mechanical requirements are not often encountered but where the demand is high for polymeric materials which exhibit good electrical properties and which retain these properties at high operating temperatures.

Despite the promising applications for poly(vinyl carbazole), the high manufacturing costs, lack of uniformity, poor color and commercial availability in generally unsuitable form, i.e., solid chunks or syrups, which have heretofore characterized the polymer, have all contributed to its limited commercial acceptance and use.

The above-described disadvantages, i.e., high manufacturing costs, lack of uniformity, etc., are primarily attributable to the polymerization methods which have heretofore been employed in the manufacture of poly(vinyl carbazole). Although vinyl carbazole has been polymerized by a number of different techniques, the commercially available products are largely prepared by mass or solution polymerization methods.

In mass polymerization, the viscosity of the mass increases until solidification occurs. As a result, agitation of the mass to aid in heat removal and to maintain a uniform temperature within the reaction mass becomes increasingly difficult and eventually impossible. Consequently, the use of heavy, powerful and costly stirring equipment and elaborate cooling systems is usually necessary. Because of temperature gradients in the reaction mass, polymers are produced which may not be uniformly polymerized throughout the mass. In addition, it is difficult to carry a mass polymerization to completion. The polymerization is usually terminated prior to completion and the resulting polymer contains monomer which impairs its properties. Alternatively, the polymerization is allowed to proceed until nearly complete and the resulting solid, polymeric fragments are washed to remove residual monomer and then dried. The extraction of residual monomer from such fragments is slow and difficult.

The other polymerization technique generally employed is solution polymerization wherein the monomer and resulting polymer are both soluble in the solvent employed. Here, too, agitation problems arise because of the high viscosities of the resulting concentrated polymer solutions. Thus, heavy equipment similar to that required in mass polymerization may be necessary. Moreover, complete removal of the solvent from the polymer generally requires prolonged vacuum drying, and the solvent and unreacted monomer are very difficult to remove. To accomplish these things while avoiding discoloration and foreign matter in the polymer requires expensive engineering and equipment.

Still further, the polymerization methods which have heretofore been employed have required the use of high purity monomer which has greatly contributed to the high manufacturing costs associated with the polymer.

It would be considered highly desirable to provide an efficient and economic process for preparing high quality poly(vinyl carbazole) in an easily recoverable and usable form.

Accordingly, it is an object of the present invention to provide a process for the preparation of poly(vinyl carbazole) which will substantially overcome the above-noted deficiencies which have heretofore limited the acceptance and use of said polymer.

It is another object of this invention to provide an efficient and economic process for rapidly preparing high quality poly(vinyl carbazole) in high yields.

It is still another object of this invention to provide a process for preparing poly(vinyl carbazole) wherein low grade monomeric vinyl carbazole can be employed.

It is a still further object of this invention to provide a process for preparing poly(vinyl carbazole) in discrete particulate form thereby simplifying the recovery and purification thereof and providing the polymer in readily usable form.

These as well as other objects are accomplished by the present invention, which provides a process for the preparation of poly(vinyl carbazole) comprising charging (1) monomeric vinyl carbazole, (2) an inert, organic solvent for said vinyl carbazole, said solvent being a nonsolvent for the resulting polymer, and (3) a cationic polymerization catalyst to a polymerization zone; maintaining the resulting mixture in said zone at a temperature ranging from about −50° to about 100° C. for a period of time sufficient to cause polymerization of said monomer and substantially simultaneous precipitation of discrete particles of poly(vinyl carbazole) forming a polymer slurry, and thereafter recovering said polymer from said slurry.

Monomer grade N-vinyl carbazole is commercially available and can be generally obtained by addition of carbazole to acetylene, by dehydration of N-ethylol carbazole obtained by the reaction of potassium carbazole with ethylene oxide, by the reaction of potassium carbazole with vinyl chloride and other similar techniques. The monomer is a white solid melting at 65° C. Quite advantageously, it has been found that the polymerization system of the present invention enables low grade monomer, i.e., monomer containing impurities associated therewith and attributable to the manufacture thereof to be employed. For example, anthracene, a major impurity in carbazole from coal tar sources, could not be tolerated in many of the polymerization systems of the prior art. Consequently, it was heretofore considered necessary to treat the monomer prior to use in polymerization to substantially remove any traces of anthracene as well as other impurities.

The solvents employed in the present invention are inert organic solvents which are liquid under reaction conditions and within which the vinyl carbazole monomer is soluble but the resulting poly(vinyl carbazole) is substantially insoluble and will precipitate therefrom as discrete particles. Moreover, the solvent is essentially inert to cationic catalysts. Solvents which are particularly useful in the present invention are aliphatic and alicyclic hydrocarbons containing at least about 5 carbon atoms and preferably from about 5 to about 10 carbon atoms, such as hexane, cyclohexane, heptane, octane and the like; carbon tetrachloride and mixtures of carbon tetrachloride with said aliphatic and alicyclic hydrocarbons wherein said carbon tetrachloride can be present in amounts varying from about 5% to about 95% by weight; preferably, however, equivalent amounts of carbon tetrachloride and the aliphatic or alicyclic solvent are employed; mixtures of said aliphatic or alicyclic solvents with each other or with aromatic hydrocarbons, especially those containing from 6 to about 12 carbon atoms can also be employed. For example, mixtures of aliphatic or alicyclic solvents with aromatic solvents such as benzene, toluene, xylene and the like have been found suitable. In such mixtures, the aliphatic or alicyclic solvents are present in amounts ranging from about 30% to about 95% by volume. Preferably, equivalent mixtures are employed.

The catalysts employed in the present invention are of the cationic type. Any strong protonic acid or Lewis acid can be suitably employed as, for example, boron trifluoride etherate, aluminum chloride, zinc chloride, stannous chloride, toluenesulfonic acid, sulfuric acid and the like. The catalyst can be employed in catalytically effective amounts generally ranging from about 0.0001 to about 1% by weight. The catalyst concentration is not considered critical and can vary depending upon the specific catalyst employed, the operating conditions and the desired molecular weight range of the polymer.

Although the concentration of monomer is not considered critical, it has been found in the present invention that when monomer concentration is too low the molecular weight, yield and rate of polymerization are adversely affected. Conversely, when monomer concentration is too high, the polymeric particles which form tend to agglomerate forming lumps which are difficult to dry. The monomer concentration can vary from solvent to solvent; however, it is considered preferable to employ from about 2 to about 50 weight percent of monomer, and most preferably, from about 5 to about 25 weight percent of monomer.

The polymerization reaction can be conducted at temperatures within the range of from about −50° C. to about 100° C. Preferably, the polymerization is conducted at temperatures of from about −25° C. to about +50° C. The polymerization proceeds at atmospheric pressure, sub-atmospheric pressures and super-atmospheric pressures. It is not necessary to conduct the polymerization in an inert atmosphere; however, an inert gas may be used to keep out moisture and overcome any fire hazard. Any inert gas, such as argon, nitrogen and the like, can be employed to provide an inert blanket surrounding the reaction medium. The inert gas can conveniently be employed as a means of regulating pressure within the reaction system.

Since the polymer precipitates out of the reaction medium as discrete particles, it can be easily and conveniently recovered simply by filtering the discharged polymer slurry, washing the collected polymer and drying.

The process of the present invention can be conducted on a batch basis or continuously. On a continuous basis, the unreacted monomer and solvent can be recovered from the polymer slurry, purified and then recycled.

In practicing the present invention, the monomeric vinyl carbazole can be dissolved in a solvent for said monomer, said solvent being a nonsolvent for the polymer produced, and charged to the polymerization zone together with a catalytically effective amount of a cationic catalyst. The polymerization proceeds rapidly at temperatures of from about −50° C. to about +100° C., and preferably at about −25° C. to about +50° C. The polymerization can occur in a single reactor or in a series of reactors obtaining a desired conversion in each reactor in the train. If desired, additional increments of catalyst can be added during the polymerization. The resulting polymer slurry can be discharged from the reactor. Any unreacted monomer can be separated from the slurry and be recycled to the feed stream. The slurry can then be passed over a filter to collect the particulate polymer. The solvent filtrate can be purified, as by distillation, and recycled to the feed stream. The recovered particulate polymer can be redispersed in a wash medium such as hot alcohol, refiltered and then dried. The polymer thus obtained is a white, finely-divided powder.

This process is suitable for producing low molecular weight poly(vinyl carbazole), i.e., weight average molecular weight from about 1,000 to about 50,000. This polymer can readily be washed to an extremely low content of residual monomer and other extractable impurities. Low molecular weight polymer is easier to mold than is the more rigid higher molecular weight polymer. Electrical properties are substantially independent of molecular weight.

The following specific examples further illustrate the present invention. Unless otherwise stated, all percentages and parts are by weight.

EXAMPLE 1

A 500 milliliter, 4-necked flask was fitted with an agitator, thermometer and a gas inlet tube for providing a continuous blanket of dry nitrogen. The vessel was charged with 20.0 grams of vinyl carbazole containing 2% anthracene as an impurity and 180 milliliters of cyclohexane. The resulting solution was cooled to 5–10° C., partly crystallizing while cooling. Thereafter, 1.0 milliliter of 2.5% boron trifluoride etherate in tetrahydrofuran was added resulting in a rapid exothermic polymerization. After one hour, the resulting slurry of discrete particles of poly(vinyl carbazole) dispersed in the solvent was filtered. The recovered polymer was washed free of solubles with hot methanol and dried at 90° C. 19.1 grams of discrete white particles of poly(vinyl carbazole) were obtained (95.5% yield) exhibiting a relative viscosity (1% in benzene at 25° C.) of 1.148.

EXAMPLE 2

Employing substantially the same procedure as described in Example 1, vinyl carbazole was polymerized in carbon tetrachloride as solvent. Upon admixture and cooling to 5–10° C., the monomer did not crystallize. 18.0 grams of poly(vinyl carbazole) were recovered (90% yield) exhibiting a relative viscosity (1% in benzene at 25° C.) of 1.142.

EXAMPLE 3

Employing substantially the same procedure as described in Example 1 except using a mixture of 90 milliliters carbon tetrachloride and 90 milliliters heptane in lieu of cyclohexane as solvent, 18.2 grams of discrete white particles of poly(vinyl carbazole) were obtained (91% yield) exhibiting a relative viscosity (1% in benzene at 25° C.) of 1.163.

EXAMPLES 4–6

Employing substantially the same procedure as described in Example 1, 10 grams of pure vinyl carbazole was polymerized in 80 milliliters of an equivolume mixture of benzene and heptane at 25° C. In the following examples, varying amounts of catalyst, a 1.2% BF$_3$ etherate solution in tetrahydrofuran, were employed. Table I below summarizes the results obtained.

TABLE I

| Example | Catalyst (ml.) | Yield of polymer (percent) | Relative viscosity [1] |
|---|---|---|---|
| 4 | 0.1 | 90 | 1.19 |
| 5 | 0.2 | 94 | 1.21 |
| 6 | 0.5 | 96 | 1.19 |

[1] 1% in benzene at 25° C.

EXAMPLES 7–9

Employing the same procedure as described in Examples 4–6, polymerization of vinyl carbazole was conducted with 0.2 milliliter of catalyst solution at various polymerization temperatures. Table II below summarizes the results obtained.

TABLE II

| Example | Temperature (° C.) | Polymer yield (percent) | Relative viscosity [1] |
|---|---|---|---|
| 7 | 10 | 90 | 1.10 |
| 8 | 25 | 96 | 1.24 |
| 9 | 40 | 92 | 1.18 |

[1] 1% in benzene, 25° C.

EXAMPLE 10

Employing substantially the same procedure as described in Example 1, a solution of 10.0 grams of vinyl carbazole in 100 milliliters of heptane was polymerized at 25° C. employing 1.0 milliliter of a 2% solution of toluenesulfonic acid in toluene as catalyst. 6.9 grams of discrete white particles of poly(vinyl carbazole) were obtained (69% yield) exhibiting a relative viscosity (1% in benzene at 25° C.) of 1.068.

EXAMPLE 11

Employing substantially the same procedure as described in Example 10, aluminum chloride was substituted for toluenesulfonic acid as catalyst. 6.0 grams of discrete white particles of poly(vinyl carbazole) were obtained (60% yield) exhibiting a relative viscosity (1% in benzene at 25° C.) of 1.059.

While several specific embodiments of the present invention have been described in detail, it will be understood that the present invention is not limited to these specific examples and that various modifications may be made therein, as heretofore indicated, without departing from the spirit of this invention or the scope of the appended claims.

What is claimed is:

1. A process for the preparation of readily separable particulate, poly(vinyl carbazole) comprising charging (1) monomeric vinyl carbazole, (2) an inert, organic solvent for said vinyl carbazole, said solvent being a nonsolvent for the resulting polymer and is a member selected from the group consisting of aliphatic hydrocarbons, alicyclic hydrocarbons, said aliphatic and alicyclic hydrocarbons containing from about 5 to about 10 carbon atoms; mixtures of said aliphatic and alicyclic hydrocarbons; carbon tetrachloride; mixtures of carbon tetrachloride and said aliphatic or alicyclic hydrocarbons; and mixtures of said aliphatic or alicyclic hydrocarbons with aromatic hydrocarbons containing from about 6 to about 12 carbon atoms, and (3) a catalytically effective amount of a cationic polymerization catalyst to a polymerization zone; maintaining the resulting mixture in said zone at a temperature ranging from about —50° C. to about +100° C. for a period of time sufficient to cause polymerization of said monomer and substantially simultaneous precipitation of said particles of poly(vinyl carbazole) forming a polymer slurry, and thereafter recovering said polymer in particulate form from said slurry.

2. A process according to claim 1 wherein the mixture of carbon tetrachloride with aliphatic or alicyclic hydrocarbons contains from about 5% to about 95% carbon tetrachloride by volume.

3. A process according to claim 1 wherein the mixture of aromatic hydrocarbon with aliphatic or alicyclic hydrocarbon contains said aliphatic or alicyclic hydrocarbon in amounts ranging from about 30% to about 95% by volume.

4. A process according to claim 1 wherein the cationic catalyst is present in amounts ranging from about 0.0001 to about 1% by weight.

5. A process according to claim 1 wherein the monomer is present in amounts ranging from about 2 to about 50% by weight.

6. A process according to claim 5 wherein the monomer is present in amounts ranging from about 5 to about 25% by weight.

7. A process according to claim 1 wherein the polymerization reaction is conducted at temperatures varying from about —25° C. to about +50° C.

8. A process according to claim 1 wherein the polymerization reaction is conducted in an inert atmosphere.

9. A process according to claim 1 wherein the polymer is recovered by filtering the polymer slurry, washing the collected polymer and drying said polymer.

10. A process according to claim 1 conducted on a continuous basis wherein the unreacted monomer and solvent are separated from the polymer slurry, purified and recycled to the polymerization zone.

References Cited

UNITED STATES PATENTS

| | | | |
|---|---|---|---|
| 2,546,924 | 3/1951 | Freudenberg | 260—88.3 R |
| 3,336,279 | 8/1967 | Scott | 260—88.3 R |
| 2,728,770 | 12/1955 | Mahan | 260—88.3 R |
| 3,073,808 | 1/1963 | Mertz | 260—88.3 R |
| 2,072,465 | 3/1937 | Reppe et al. | 260—88.3 R |
| 2,877,216 | 3/1959 | Fikentscher et al. | 260—88.3 R |
| 2,953,546 | 9/1960 | Thomas et al. | 260—88.3 R |

HARRY WONG, JR., Primary Examiner